S. BRADY.
Seed-Planter.
No. 2,540. Patented Apr. 6, 1842.
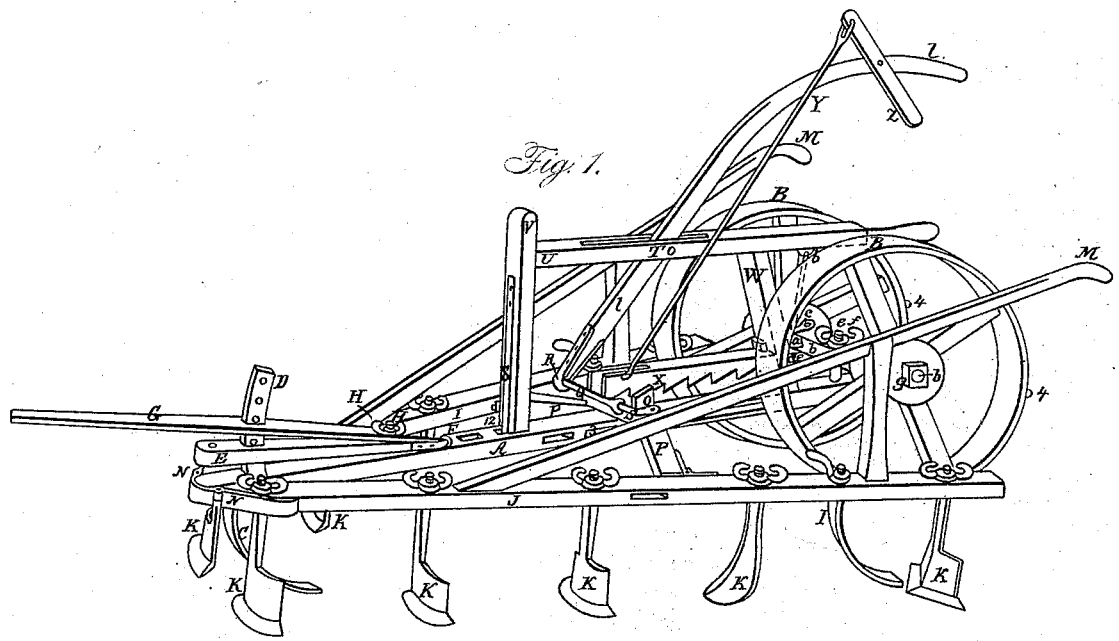
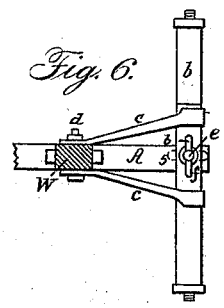
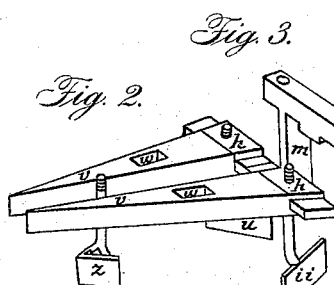
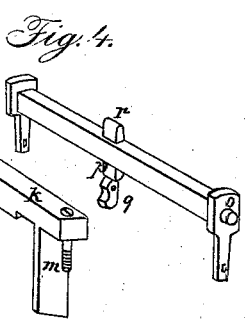
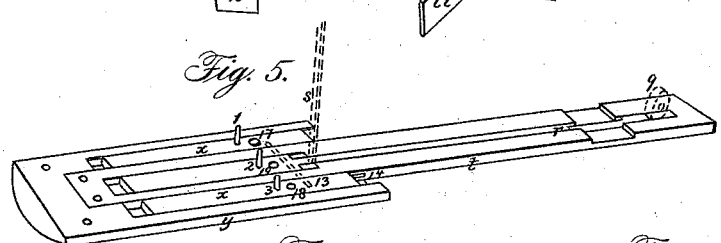
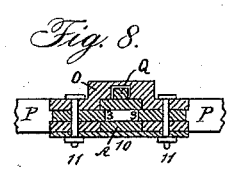
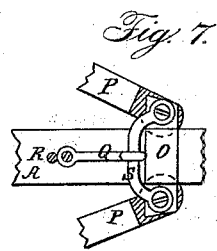

UNITED STATES PATENT OFFICE.

SAM BRADY, OF SALONA, PENNSYLVANIA.

IMPROVEMENT IN CORN-CULTIVATORS.

Specification forming part of Letters Patent No. 2,540, dated April 6, 1842.

*To all whom it may concern:*

Be it known that I, SAM BRADY, of Salona, in the county of Clinton and State of Pennsylvania, have invented a new and useful improvement in a machine for agricultural purposes, such as tilling the earth, planting and covering grain and seeds, sowing plaster, ashes, &c., called "Sam Brady's Pennsylvania Labor-Saving Corn Planter and Cultivator," which is described as follows, reference being had to the annexed drawings of the same, making part of this specification.

Figure 1 is a perspective view of the machine represented in the position as used as a cultivator; Fig. 2, the triangular blocks, openings for side hoppers, furrowing-teeth, horizontal blocks, and coverers; Fig. 3, transverse beam and guards; Fig. 4, square axle, cams, and lever; Fig. 5, slides for seed, plaster, and ashes, and the concave ways under them; Fig. 6, top view of beam and axle, showing their connection; Fig. 7, top view of knee-block, rod, eye, and loop; Fig. 8, section of knee-block, beam, and plate; Fig. 9, vertical transverse section through the said slides.

Similar letters refer to corresponding parts.

The frame of this machine consists of a horizontal longitudinal center timber, A, to which the animals that draw the machine forward are attached, and a pair of wheels, B B, for supporting it and regulating the depth of the tillage. A curved slide and regulator, C, for supporting the forward end of the frame at the required height from the ground and for regulating the depth of the cutting of the cultivators, is secured to the front end of the center timber, A, by a screw, or in any convenient way, said slide moving over the surface of the ground. It is made and secured in the usual manner, resembling in form the front part of a sleigh-runner.

A segment-sword, D, for sustaining the tongue and shafts or thills and steadying the motion of the machine, is mortised into the center timber, A, being perforated with apertures for pins, which sustain the draft-timber, tongue, or shafts in any required position by said pins being inserted through said apertures and through other holes in the tongue and draft-timber, or below and above the same, the said sword being previously passed through oblong apertures in said draft-timber, tongue, and thills. The draft-timber E (so called because the animals draw by it) is slipped over the aforesaid sword D by means of an oblong aperture in said timber near its front end, while its opposite end is attached to the center timber by a staple and eye, F, hinge, or otherwise. The animals that draw the machine are attached to said draft-timber E by any of the usual methods in use.

The tongue G, by which the machine is guided, is provided with an oblong mortise to admit the sword to pass through it, and is attached at one end to the draft-timber by means of a bolt and screw, H, or otherwise. The thills or shafts are attached in a similar manner.

Two extension side timbers, I J, to which the cultivators K, curved slides L, and handles M are affixed, are attached to the front end of the center beam by strap hinges N, so as to allow them to be brought near to or recede farther from the center beam, A, at pleasure, for altering the width of the cultivation by means of a knee-joint, o, in the manner hereinafter described. The side timbers are a little shorter than the center beam. The handles M are fastened to the top of these timbers, inclining toward each other, by mortises and tenons and uprights $P^2$, which are also mortised and tenoned into said timbers and handles. The teeth or cultivators K, which are of a triangular, curved, winding, or of any required shape, are secured in the aforesaid side timbers, I J, by means of screw-shanks formed on their upper ends, which are passed through apertures in said timbers, the shoulders on said teeth resting firmly against plates or washers arranged on the under side of the timbers, and nuts screwed on the upper ends firmly against the tops of the timbers or washers or plates placed thereon.

The curved slides L, for regulating the depth of the cutting of the cultivators or teeth by sliding over the surface of the ground, are secured to the side timbers in a manner similar to that in which the teeth are secured. They are made like the front slide, C, before described.

The knee-joint o, before mentioned, for extending and contracting the timbers I J containing the cultivators, is made as follows: It consists of two limbs, P P, attached at their outer extremities by hinges to the movable side timbers, I J, and at their opposite ends to a knee-block, o, having an anti-friction roller, 9, which moves backward and forward upon the center timber, A, and to a plate, 10, which slides under said center timber by means of vertical screw-bolts 11, passed through said block, limbs, and plate, having nuts screwed on the upper ends of said bolts, the aforesaid knee-block o being moved toward the person attending the machine by a curved lever, l, in order to expand the cultivators, and move it from him to contract them. Curved tenons are formed on the outer extremities of the limbs P, fitting into corresponding mortises, 12, in the side timbers, having shoulders corresponding with the angle that the sides of the timber assume when extended to their greatest width, and against which timbers said shoulders fit. Other curved tenons are formed on the ends of the limbs attached to the knee-block, which enter and slide in grooves 33, made in the sides of the center timber, A. Horizontal wheels turning on vertical pins in the extremities of the aforesaid limbs may be substituted for the curved tenons.

The lever l, for extending or contracting the cultivators, is attached at the extremities of its short end to the knee-block o by means of a connecting-rod, Q, eye R, and loop S, made in the usual manner of such connecting-links. It turns on a horizontal pin or bolt, T, as its fulcrum, passed through it and through a short horizontal timber, U, supported above the center beam, A, by two upright posts, V W, mortised and tenoned into the same. The lever passes through a mortise in the said horizontal timber U. This horizontal timber is extended beyond the rear post and formed into a handle, by which the operator may lift or move the machine to the right or left. The stop-timber X, so called because it stops the knee-block or prevents it from receding toward the rear of the machine, is a straight piece of timber open or forked at one end and notched on the under side. This stop-timber X has teeth formed on its under side for the purpose of holding the knee-block o to any required position by means of said teeth. It is passed through a mortise in the rear post, W, and hinged to it, or attached to it by a bolt passing through the post and end of the stop-timber, its front having an opening, 7, in it to allow it to be raised or lowered on its hinge or bolt without touching the lever l, which enters said opening, said stop-timber being raised at pleasure by the operator standing at the rear of the machine for the purpose of disengaging the teeth of the stop from the knee-block o by means of a cord, chain, or rod, Y, attached to the aforesaid stop-timber and extended to the extremity of a small straight lever, Z, turning on a pin inserted into the curved lever, near the upper end thereof, within reach of the operator, who, when he desires to alter the distance between the cultivators, lays hold of said small lever Z, lifts the stop X from the knee-block o, and simultaneously laying hold of the curved lever l moves it toward or from him, as he wishes to contract or expand the cultivators or alter the width of furrows.

The top of the knee-block o is sloped on the upper side to correspond with the slope of the teeth of the stop X. A key or wedge, a, is inserted into the mortise in the rear post, W, under the rear end of the stop X to hold it firmly down upon the knee-block o; and in order to hold the stop up in a raised position said key is inserted above the stop in said mortise. This key is suspended to the top timber, U, by a chain or cord, 6. It is inserted above or below the stop X when required to be held in a particular position.

The axle b of the wheels is attached to the rear post, W, by means of two parallel straps or arms, c c, passed around its axle near its middle, and secured to said post by a round horizontal bolt, d, passed through them and said post W, and on which they have a vertical movement as the wheels pass over eminences or uneven ground, said axle b being also attached to the center beam, A, by means of a vertical bolt, e, passed through an oblong slot, 5, in the beam, and through the axle b, having a broad flat head on its lower end resting against the under side of the beam b, and a screw on its upper end, on which a nut, f, is screwed, turning on the top of the axle b, for raising or lowering the center beam. The axle of the wheels, however, may be attached to the beam in the above or in any convenient way. (See Fig. 6, which represents the above-described mode.) The arms of said axle pass through round apertures in square blocks g, fitting into corresponding square apertures in the hubs, the wheels turning on said arms, and these and the axle remaining stationary.

The wheels B, in other respects, are made in the usual manner. The aforesaid wheels, axle, straps, and bolts may be separated from the beam and post, and, by means of the tongue and bolt or shafts and a block and body, may be formed into a cart for one or two horses, or for a hand-cart.

This machine may be also adapted to the purposes of planting and sowing in the following manner: Two horizontal blocks, h h, having tenons on their ends, are arranged between the center beam, A, and side timbers, I J, the tenons being placed in mortises therein. The side timbers are then brought toward the beam against the shoulders of said blocks, which are beveled on their edges to suit the angle of the same. An obliquely-placed coverer, i i, for covering the seeds is arranged in each of said blocks, one on either side of the beam, and secured in the manner of securing the cultivators, before described, by nuts and screws. These coverers are made in the usual manner. A transverse beam, K, is then arranged between the posts V W, and bolted to the side timbers, I J, by bolts passing through said transverse timbers and through two of the mortises in the side timbers, from which two of the cultivators have been previously extracted. This timber braces the side timbers, I J, firmly, being arranged near the wheels. Two guards, m m, for removing obstructions from in front of the wheels, project down from said transverse timber K, their lower ends moving near the surface of the ground, being made in the manner of the guards placed in front of the wheels of a locomotive steam-engine, and mortised and tenoned into said transverse timber.

In rough ground one of the aforesaid coverers i i may be arranged near the transverse beam, its shank being secured in one of the limbs P of the knee-joint in an aperture therein. By this arrangement the clogging of the machine is prevented, one coverer throwing the obstructions to the right and the other to the left. If the two coverers were on the same transverse beam or in a right line, they would catch the obstructions and carry them forward with the machine.

The stationary axle b of the cultivator, and the blocks g in the hubs in which its arms are placed, may be removed and a square axle, n, designed to turn with the wheels B, put in the place of the said fixed axle. This axle n extends beyond the hubs of the wheels having round arms, which turn in round apertures in uprights o o, having tenons which pass through openings in the beams from which two of the cultivators are removed, being secured by bolts or screws on the under side of the beams. This axle is provided with two cogs, p p, for moving the planting-slide by striking against the upper end of a lever, q, turning on a pin inserted in the center beam, said lever extending above and below the beam, and resting against the rear end of the planting-slide r, said planting-slide being held against the lower end of the lever q by a vertical spring, s, fastened to the front post, V, and extending through the beam A into the slide r. The position of lever q is represented by dotted lines in Fig. 5.

The planting-slide r is made in the form of a spade, with an aperture, 19, through the wide part to admit the seed, and is placed lengthwise against the under side of the beam, in which position it is held by a concave way, t, in which the slide moves backward and forward, secured to the under side of the beam A by screws or other suitable means.

An opening, u, to admit the middle or seed hopper, is made through the beam a few inches in advance of the front post. An opening, 16, is made through the concave way for the seed to drop through when the aperture 19 in the slide containing the seed is made to coincide therewith by the spring s, when it pushes the slide back after the cam has acted on the lever and moves the slide forward, bringing the aperture 19 therein under the hopper to receive the seed.

Two triangular blocks, v v, are inserted between the beam A and side timbers, I J, on which are two openings, w w, for two side hoppers arranged on a transverse line with the before-mentioned seed-hopper, one for ashes and one for plaster, under which are arranged two short longitudinal slides, x x, having holes through the same to receive the ashes and plaster which descend into them from the hoppers, said slides being connected with the first-described seed-slide by a transverse rod, 13, passing through the three slides r x x, and moving in grooves 14 in the sides of the way t, as represented by dotted lines, Fig. 5. The aforesaid short slides are held against the triangular blocks by a concave board, y, in which the said slides move, secured to the under side of the machine by screws having apertures 20 21 through the board y corresponding with the apertures in the slides, when they are drawn back by the spring s to cause all the apertures to coincide, when the seed, plaster, and ashes will drop through them. Vertical pins 1 2 3 or stirrers are fixed in the slides for agitating the substances in the hoppers. There is a cog or protuberance, 4, on the periphery of each wheel for marking the hills where the seed is planted as they revolve.

The tooth z for opening the furrow to receive the seed is placed and secured in an aperture in the beam A in front of the middle hopper.

In order to mark the rows in parallel lines an axle may be provided extending beyond each side of the center beam the distance the rows are required to be apart, the middle row being marked by the tooth in the beam in front of the middle or seed hopper.

What I claim as my invention, and which I desire to secure by Letters Patent, is—

1. The mode of extending and contracting the cultivators by the knee-joint and curved lever, in the manner and for the purpose before described.

2. The mode of securing and liberating the knee-block by means of the toothed stop, rod, and short lever, as described.

3. The combination of the draft-timber, sword, and tongue, in the manner and for the purpose described.

4. The manner of sustaining, adjusting, and guiding the hind end of the machine by means of the before-described combination of the wheels, axle, straps, and screw-bolts.

SAM BRADY.

Witnesses:
 WM. P. ELLIOT,
 EDM. MAHER.